United States Patent [19]

Lindstrum

[11] 4,180,793

[45] Dec. 25, 1979

[54] PSK PULSE SYNTHESIZER

[75] Inventor: Alan L. Lindstrum, Bainbridge Island, Wash.

[73] Assignee: The United States of America as represented by the Secretary of the Navy, Washington, D.C.

[21] Appl. No.: 900,211

[22] Filed: Apr. 26, 1978

[51] Int. Cl.² .................... H04B 1/02; H04B 11/00
[52] U.S. Cl. .................................. 367/137; 325/116; 325/145; 367/134
[58] Field of Search ............... 340/3 A, 5 R; 325/113, 325/116, 145, 146, 161, 164

[56] References Cited

U.S. PATENT DOCUMENTS

| | | | |
|---|---|---|---|
| 3,205,475 | 9/1965 | Foss | 340/6 R |
| 3,444,510 | 5/1969 | Tyndale et al. | 340/5 R |
| 3,914,695 | 10/1975 | Giusto | 325/145 |
| 3,958,191 | 5/1976 | Jones, Jr. | 325/161 |
| 3,992,692 | 11/1976 | Filer | 340/3 A X |

OTHER PUBLICATIONS

"Diver Telemetry System", Sperry Eng. Rev., vol. 19, No. 3, 1966, pp. 25-30.

Primary Examiner—Richard A. Farley
Attorney, Agent, or Firm—R. S. Sciascia; Charles D. B. Curry; Francis I. Gray

[57] ABSTRACT

A phase shift keyed (PSK) pulse synthesizer which is part of an acoustic transmitter located in an underwater vehicle to provide identification and tracking of the vehicle as well as telemetry data when used on an instrumented underwater tracking range. The synthesizer is synchronized with the range time standard and generates phase coded pulses in a format suitable for input to an amplifier. A timing circuit divides a high frequency clock to produce square wave outputs at the desired frequency. A programmed read only memory (PROM) contains the identification code and is addressed from the timing circuit. A phase shift modulator combines the desired frequency with signals from the PROM and from a telemetry data generator to provide the amplifier with a digital analog of the desired acoustic message to be transmitted.

10 Claims, 7 Drawing Figures

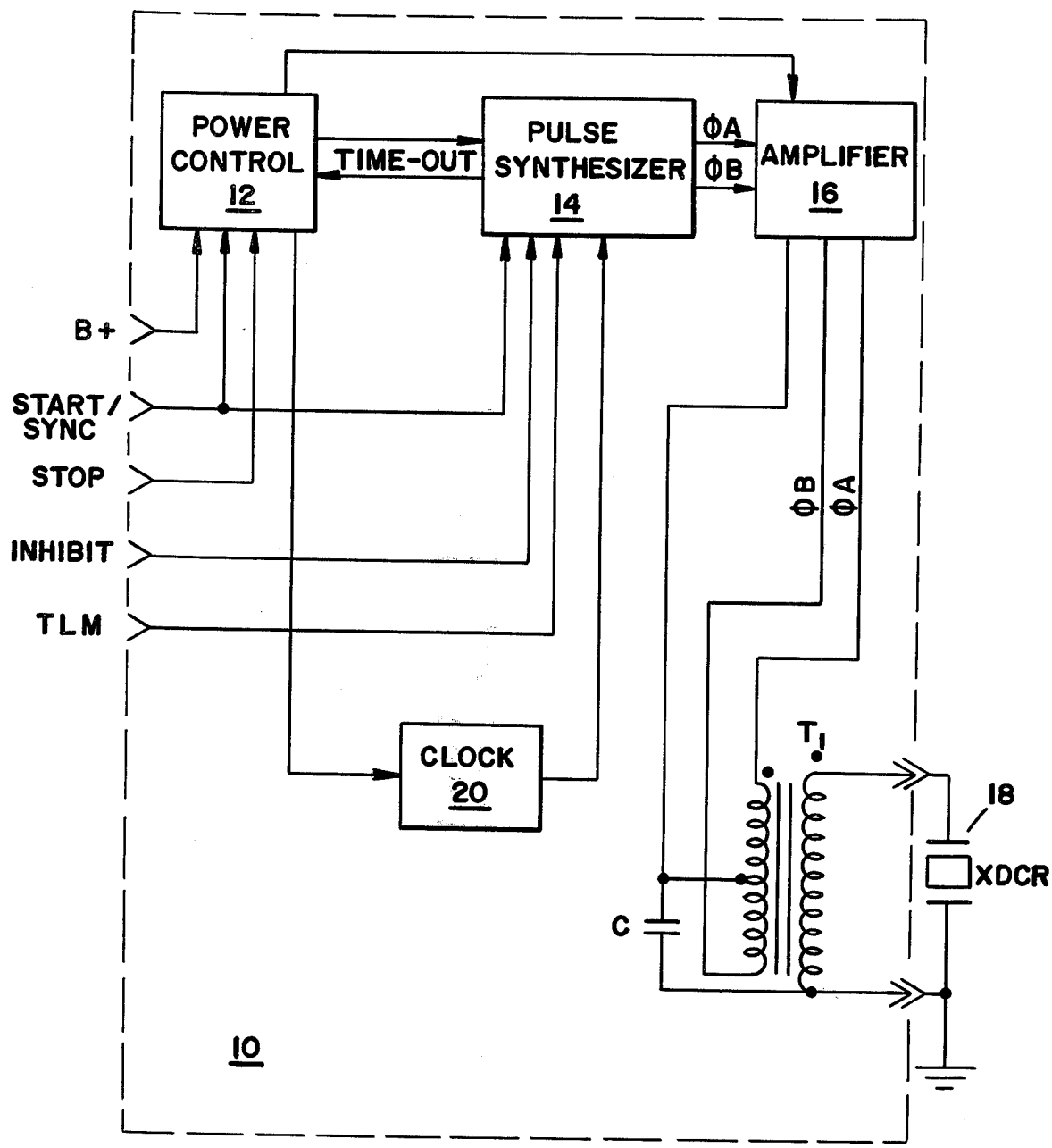
FIG_1

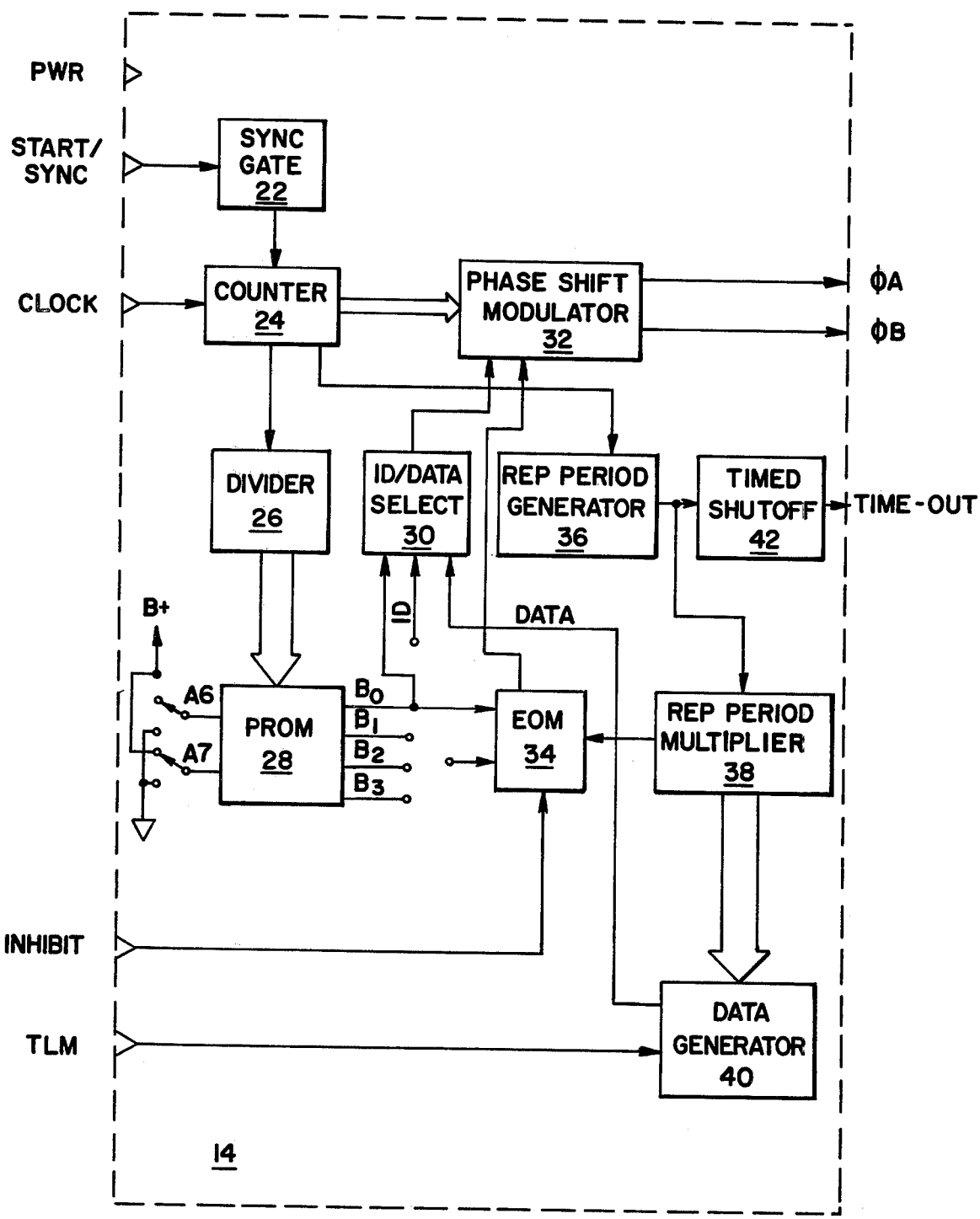
FIG _ 2

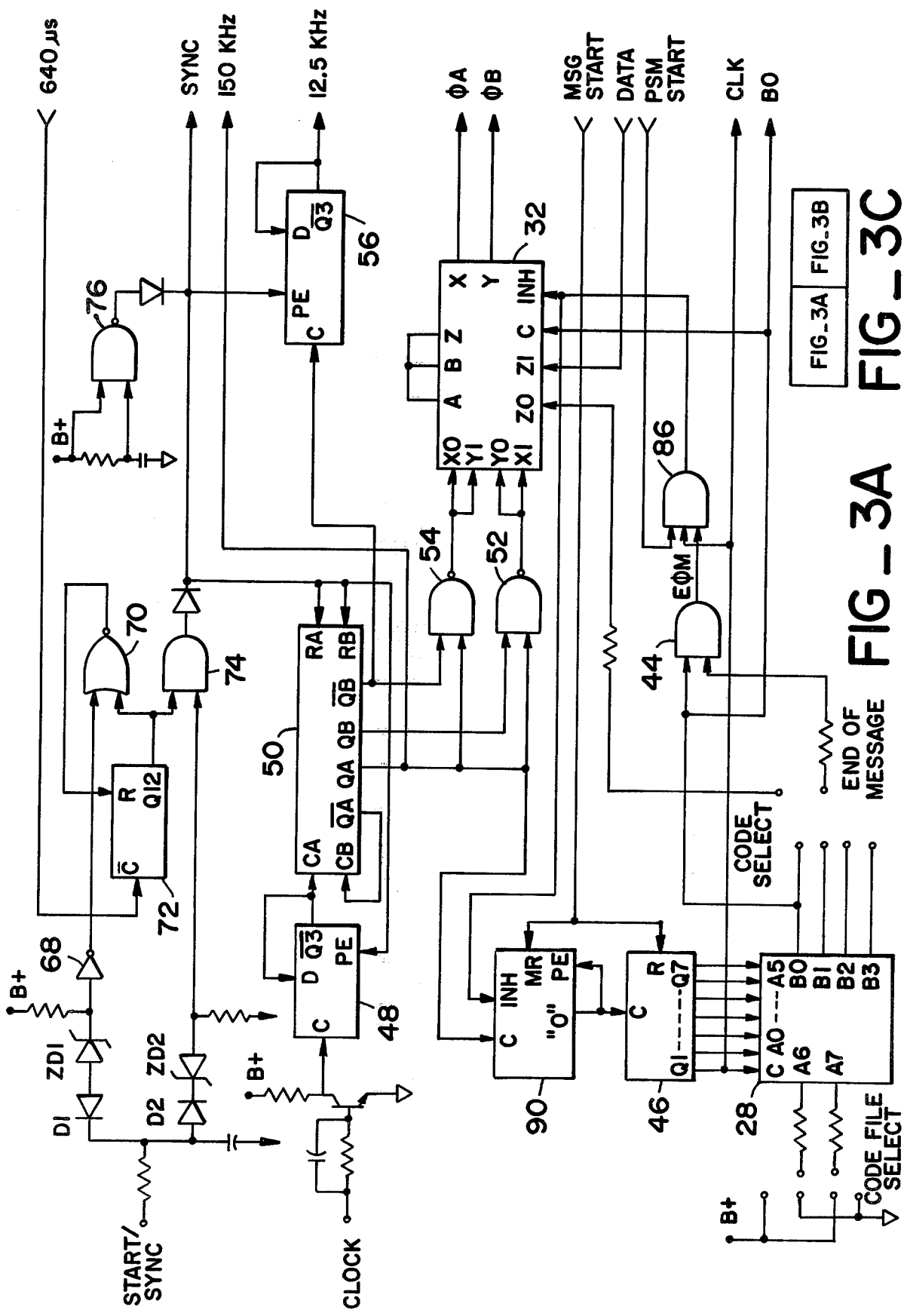

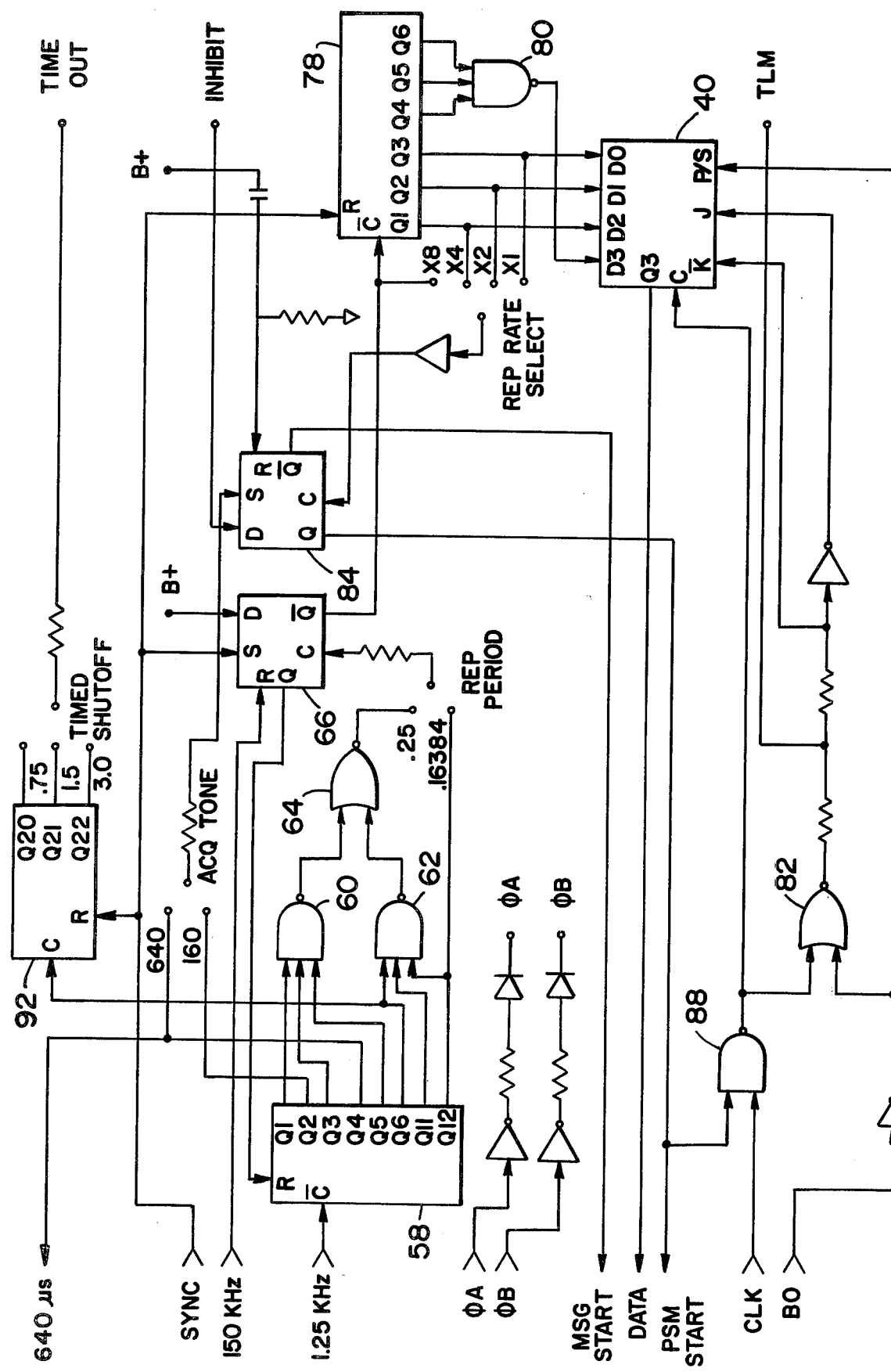
FIG_3B

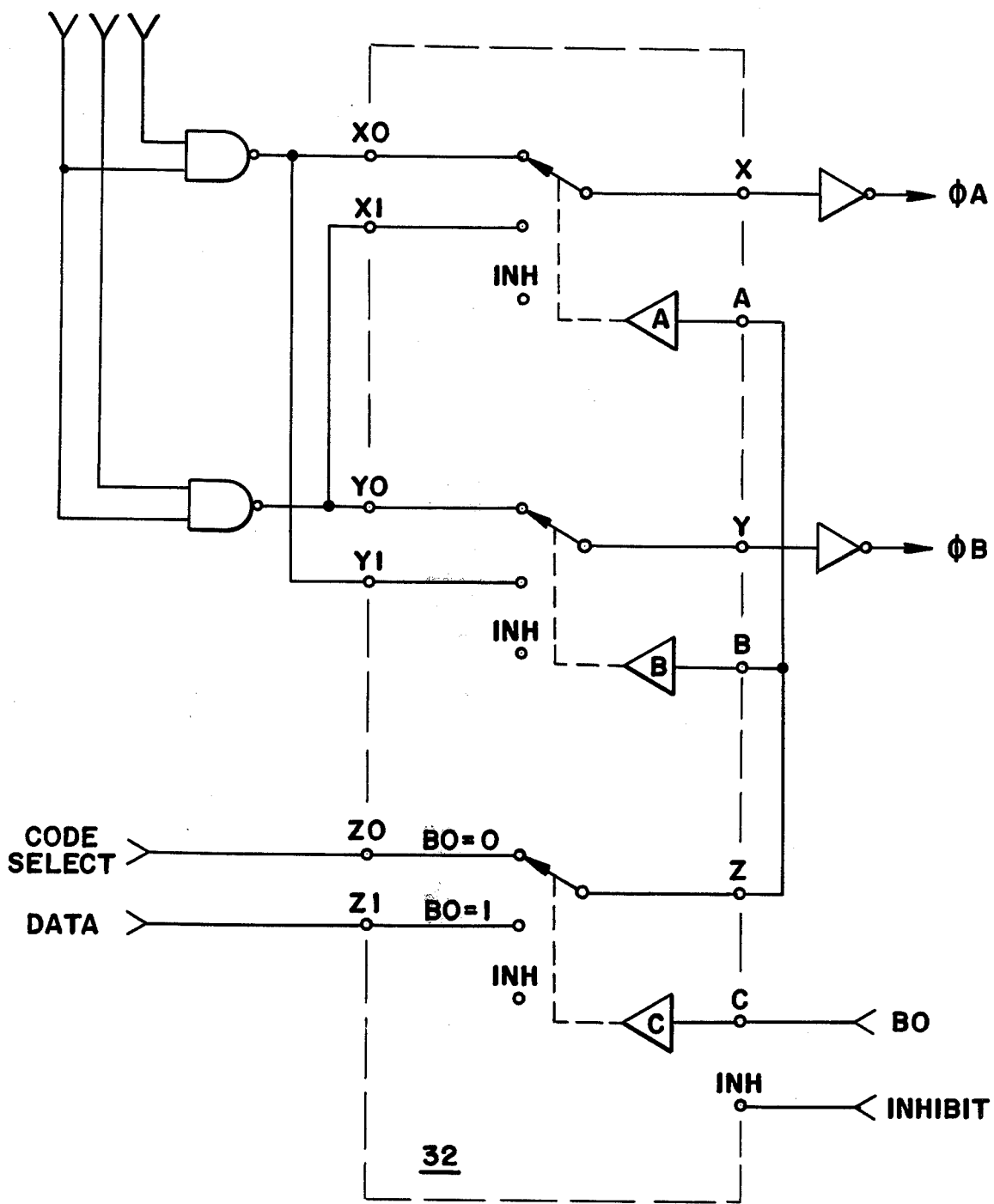
FIG_4

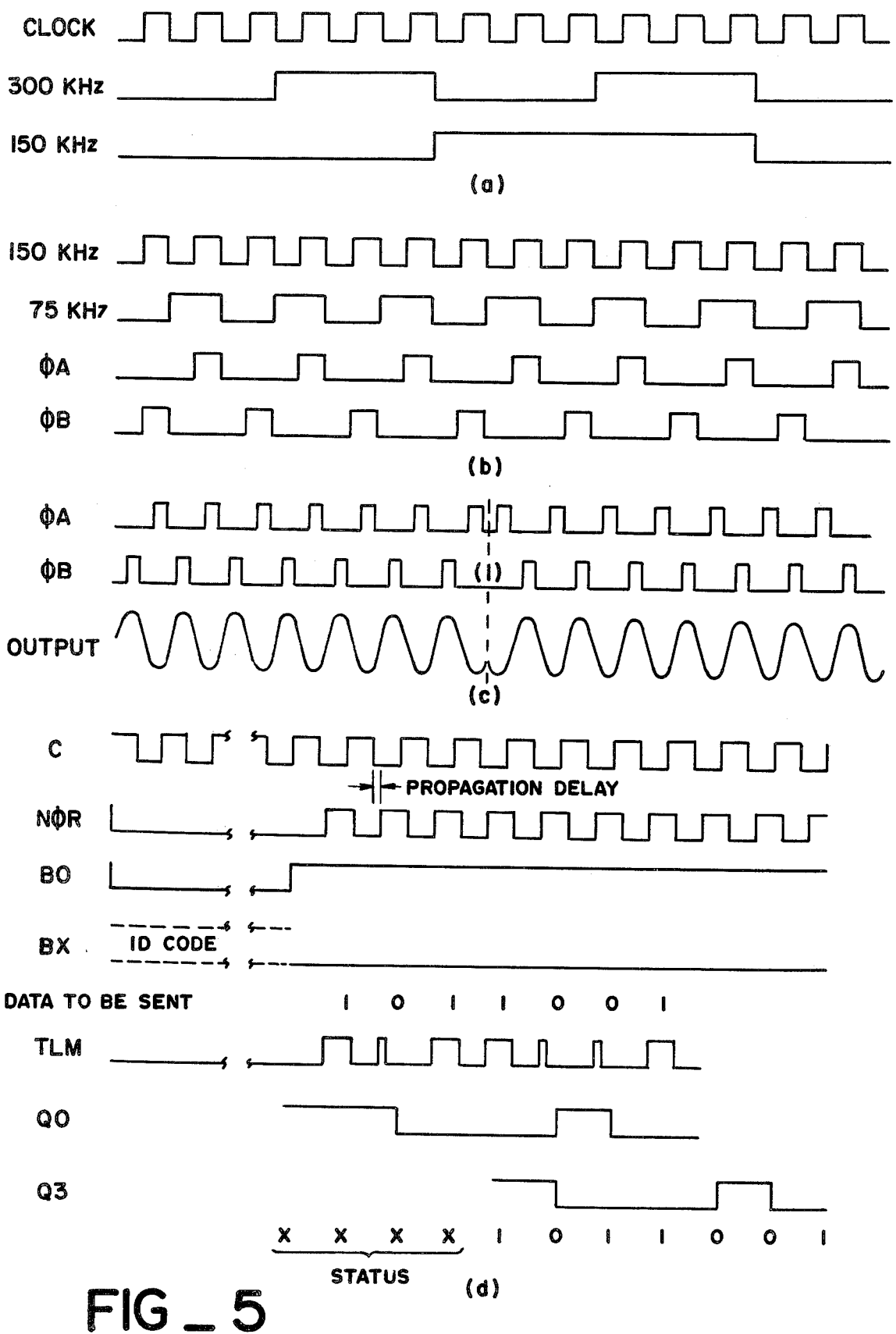
FIG_5

PSK PULSE SYNTHESIZER

BACKGROUND OF THE INVENTION

1. Field of the Invention

The present invention relates to acoustic transmitters, and more particularly to a phase shift keyed (PSK) pulse synthesizer to provide a digital analog pulse train.

2. Description of the Prior Art

Current transmitters for underwater vehicles used on instrumented underwater tracking ranges generate a simple tone burst, with all tracked vehicles generating identical tones and with no telemetry being available. Timing is based on amplitude transition on the detected envelope of the burst. Due to the simple tone method object identity between multiple vehicles is not available, status of the vehicle is not available, and a signal-to-noise ratio (S/N) of +15 dB is required to validate the message and obtain timing.

SUMMARY OF THE INVENTION

Accordingly, the present invention provides a phase shift keyed (PSK) pulse synthesizer which provides a digital analog pulse train to an acoustic amplifier for transmission as an acoustic PSK message synchronized with an instrumented underwater tracking range. A temperature compensated crystal oscillator is input to a long counting chain to provide all the fundamental timing. A programmed read only memory (PROM) containing the identification (ID) codes clocks out a new phase signal to a phase shift modulator every n cycles according to the ID code selected. At the end of the ID code a data generator shift register controls the phase shift modulator to clock out a preprogrammed number of status and telemetry bits to complete a PSK message. The output of the phase shift modulator is input to an amplifier for transmission.

Therefore, an object of the present invention is to provide a PSK pulse synthesizer for an acoustic transmitter which identifies the transmitting vehicle.

Another object of the present invention is to provide a PSK pulse synthesizer for an acoustic transmitter which is synchronized with the time of an instrumented underwater tracking range.

Yet another object of the present invention is to provide a PSK pulse synthesizer for an acoustic transmitter which has a stable, discrete timing pulse train for more accurate tracking.

Still another object of the present invention is to provide a PSK pulse synthesizer for an acoustic transmitter which is capable of transmitting status and telemetry information.

A further object of the present invention is to provide a PSK pulse synthesizer for an acoustic transmitter which has a message validatible at low signal-to-noise ratios.

Other objects, advantages and novel features of the present invention will be apparent from the following detailed description and appended claims when read in light of the attached drawing.

BRIEF DESCRIPTION OF THE DRAWING

FIG. 1 is a block diagram of a PSK acoustic transmitter.

FIG. 2 is a block diagram of a PSK pulse synthesizer according to the present invention.

FIG. 3, consisting of FIGS. 3A, 3B and 3C, is a schematic diagram for the PSK pulse synthesizer of FIG. 2.

FIG. 4 is an analogous schematic for the phase shift modulator of the PSK pulse synthesizer of FIG. 3.

FIG. 5 is a partial timing diagram for the PSK pulse synthesizer of FIG. 3.

DESCRIPTION OF THE PREFERRED EMBODIMENT

Referring now to FIG. 1 an acoustic PSK transmitter 10 is shown. A power control unit 12 regulates vehicle battery voltage B+ to required levels for the other units of the transmitter 10. A pulse synthesizer unit 14 generates phase coded pulses of the desired frequency for subsequent amplification and transmission. An amplifier unit 16 accepts the phase coded pulses from the pulse synthesizer unit 14 and amplifies to a suitable level for application to an acoustic projector 18. A clock 20 provides a high frequency square wave to the pulse synthesizer unit 14 and serves as the overall time standard for the transmitter 10.

A START/SYNC signal external to the transmitter 10 turns on the power control unit 12 and synchronizes the pulse synthesizer unit 14 with an external time standard. An external STOP signal turns off the power control unit 12 and, thus, the transmitter 10, as does a TIME-OUT signal from the pulse synthesizer unit 14. The output of the pulse synthesizer unit 14 may be inhibited by an external INHIBIT signal, although the pulse synthesizer unit continues to operate otherwise. The clock signal from clock 20, which is preferably a temperature compensated crystal oscillator to maximize stability, is divided by the pulse synthesizer unit 14 to provide all system timing for the transmitter 10 including the output frequency of the phase coded pulse trains, $\phi A$ and $\phi B$, and the TIME-OUT signal. The amplifier unit 16 amplifies the $\phi A$ and $\phi B$ pulse trains which are approximately 180° out of phase and drives transformer T1 to produce a sinusoidal output from the acoustic transducer 18 at the desired frequency (see FIG. 5(c) where (1) indicates a phase shift).

As shown in FIG. 2 a sync gate 22 accepts the START/SYNC signal to synchronize the pulse synthesizer unit 14 with the external time standard. A counter 24 accepts the CLOCK signal and divides the signal into two square waves of f and 2f where f is the transmission frequency. A divider 26 divides the 2f square wave to provide a clock and address for a programmed read only memory (PROM) 28. The PROM 28 contains the identification (ID) codes which are incremented by the clock from the divider 26. The A6, A7, B1, B2 and B3 lines of the PROM 28 are used by hardwire connections to select the desired code. The B0 line is used to signal the end of the ID code. An appropriate combination of B1-B3 lines ANDed with the B0 line selects the length of the data message. An ID/data select circuit 30 has a series of gates which are used for steering signals such as ID code, message length, etc. according to the status of the B0 line from the PROM 28. A phase shift modulator 32 combines the f square wave from the counter 24 with the ID code from the PROM 28 and with data via the ID/data select circuit 30 to provide the amplifier 16 with a digital analog phase shift keyed (PSK) wave train of the desired acoustic pulse. AN EOM decoder 34 generates an inhibit to the phase shift modulator 32 when conditions are met for an end of message either via an external INHIBIT signal or according to the message length selected by the B1-B3 lines from the PROM 28.

A rep period generator 36 is a counter and decoder which accepts the f square wave signal from the counter 24 and generates pulses of appropriate timing to begin PSK pulses at the desired repetition rate. A rep rate multiplier 38 divides the pulses from the rep period generator 36 according to installed program hardwire jumpers to generate the desired message rate and provides appropriate data to identify the message frame with relation to the external time standard. A data generator 40 is a shift register to transmit telemetry data (TLM signal) to the phase shift modulator 32 via the ID/data select circuit 30 after completion of the ID code transmission from the PROM 28. A timed shutoff circuit 42 divides pulses from the rep period generator 36 to supply a TIME-OUT signal to the power control unit 12 after an extended period of operation to conserve energy.

The counter 24, rep period generator 36 and rep rate multiplier 38 combine to form a long counter chain from which all the fundamental timing for the pulse synthesizer unit 14 is derived. A PSK message is started by timeout of the rep rate multiplier 38 which removes the inhibit via the EOM decoder 34 from the phase shift modulator 32. After a specified acquisition period the divider 26 starts to clock out a new phase signal from the PROM 28 to the phase shift modulator 32 via the ID/data select circuit 30 every n cycles for each bit change where n is an integer and n cycles equals one bit, providing differential PSK encoding. At the end of the ID code the B0 line on the PROM 28 relinquishes control of the phase shift modulator 32 to the data generator 40. After a preprogrammed number of bits determined by the B1-B3 lines from the PROM 28 have been clocked out, the EOM decoder 34 inhibits the phase shift modulator 32, i.e., stops the output $\phi$A and $\phi$B. The pulse synthesizer unit 14 is now ready to begin the next PSK message on the next timeout of the rep rate multiplier 38.

FIG. 3 shows a specific embodiment of the pulse synthesizer unit 14. For this embodiment the PROM 28 is a mask programmable 256×4 CMOS device. The 256 bit words are arranged into four 64-bit files. At each negative going edge of the PROM clock data from a specified address will appear at the four data outputs B0, B1, B2, and B3. Addressing is via the A0-A7 inputs where A7 is the most significant bit. Selection of the appropriate inputs to A6 and A7 by program hardwire selects a particular one of the four files. Each file is further subdivided into four sections corresponding to the B0-B3 lines. Since B0 is reserved for control, selection of B1, B2 or B3 via programming hardwire jumpers to CODE SELECT and END OF MESSAGE selects a unique 1 of 12 section of the PROM 28. Thus one of 12 unique 64-bit serial ID codes and a 64-bit control word is selected by selecting the two most significant bits, A6 and A7, and a particular output line, B1-B3.

The B0 control line is 0 for the ID code portion of the PSK message and 1 for the data portion. B1-B3 contain the ID codes for B0=0, and become 0 during the data portion when B0=1. The end of message is determined by ANDing the selected output line with B0 at gate 44, the message length being a function of the point at which the selected output line B1-B3 becomes 1. In operation a PROM counter 46 sequences through the preprogrammed PROM file until the EOM is decoded.

The phase shift modulator 32 may be a triple 2-channel analog multiplexer which can be regarded as three triple throw switches since the INHIBIT input causes all the outputs to be open, see FIG. 4. When the inhibit line is high the switches X, Y and Z can be considered to be in the INH position. In the absence of an inhibit the positions of the X and Y switches are controlled by the level of the Z output. The control of X and Y is either by the PROM CODE SELECT or DATA depending upon the position of the Z switch control C. Since C is connected to the B0 output line from the PROM 28, the X and Y switches are under PROM control during B0=0 and under data generator 40 control for the remainder of the PSK message where B0=1. Phase shifts are introduced as a result of changing the switch positions from X0, Y0 to X1, Y1 and conversely.

Assuming a 1.8 MHz clock input for purposes of explanation, a first divide-by-six Johnson counter 48 produces a 300 KHz output (see FIG. 5(a)). A double divide-by-two counter 50 provides a 150 KHz square wave at output QA and a 75 KHz square wave output at outputs QB and $\overline{QB}$. The sets (QA,QB) and (QA,$\overline{QB}$) are combined by NAND gates 52 and 54, respectively, to produce the X and Y signals for the phase shift modulator 32 (see FIG. 5(b)).

A second divide-by-six Johnson counter 56 takes the 75 KHz output from $\overline{QB}$ of the divide-by-two counter 50 and produces a 12.5 KHz output. A 12-bit binary counter 58 takes the 12.5 KHz signal from the second divide-by-six Johnson counter 56 and synthesizes in conjunction with NAND gates 60, 62 and NOR gate 64 a repetition period of 0.25 seconds and synthesizes directly from Q12 a repetition period of 0.16384 seconds, two periods which are one-eighth of the external time standard periods required by a particular application. The repetition period output clocks flip-flop 66 which resets the 12-bit binary counter 58. Flip-flop 66 is itself reset by the 150 KHz output from QA of the double divide-by-two counter 50 which removes the reset from the 12-bit binary counter to start the repetition period sequence over.

The START/SYNC signal is a unique signal having a three second negative pulse followed by a 20 $\mu$sec positive pulse synchronized with the external time standard. The input is divided by two different networks. When the START/SYNC input goes below a negative threshold voltage diode D1 is on the zener diode ZD1 begins to conduct, putting a low input to inverter 68 and causing NOR gate 70 to remove the reset from a binary sync counter 72. The binary sync counter 72 divides the Q4 output from the 12-bit binary counter 58 to produce a 5.2 second period, i.e., Q12 of the binary sync counter goes high after 2.6 seconds before the three second start pulse is removed from the START/SYNC input, assuring that NOR gate 70 holds off the reset for a minimum of 2.6 seconds after the initial 2.6 seconds of the start pulse. If, during the time from the end of the start pulse to 5.2 seconds after the leading edge of the start pulse, a positive sync pulse is received causing diode D2 to turn on and zener diode ZD2 to conduct, AND gate 74, enabled by Q12 high from the binary sync counter 62, provides a sync pulse to the various counters in the pulse synthesizer unit in synchronization with the external time standard. NAND gate 76 generates a sync during power-up due to the RC time constant, insuring no PSK messages during the charging cycle of the clock power supply capacitors.

A repetition rate divider 78 divides the selected repetition period from flip-flop 66 by 2, 4 or 8 to produce variable repetition rates. Program jumper selection provides the capability of choosing any of four rates. Q1, Q2, and Q3 outputs of the repetition rate divider 78 also provide internal record bits for the telemetry data to identify in which frame within the external time standard period the particular PSK message was generated. If necessary, Q4, Q5 and Q6 outputs may be combined by NAND gate 80 to flag every eighth external time standard PSK message for external computer processing purposes.

The data generator 40 is a serial/parallel four-bit shift register. When the P/S input is low, i.e., B0=1, the flag and frame data is clocked out from D0-D3 via the Q3 output to the Z1 input of the phase shift modulator 32. Telemetry data present at the J and $\overline{K}$ inputs is clocked in serially and appears at Q3 four cycles later. Thus, when B0 signals end of the ID code, control of the phase shift modulator 32 is transferred from the PROM 28 to the data generator 40, changes the data generator to serial mode and begins clocking out data. The data sequence length depends upon the message length which in turn depends on the PROM output line, B1-B4, selected. The data sequence depends upon the selected repetition rate since the first four bits of data are those which are loaded in parallel at the B0 transition. The phase reference of the phase modulator output is preserved through the transfer of control by choosing the ID codes such that the last bit of each code is a logical 1. Clocking for the data generator 40 is from the PROM counter 46.

At the highest repetition rate, x8, the first four bits of telemetry will follow the pattern 0100, 0010, 0110, 0001, 0101, 0011, 0111, 000 repeated seven times with the first (flag) bit set during the eighth iteration of the pattern. Control of the J-$\overline{K}$ inputs of the data generator 40 is given to NOR gate 82 when a high impedance is presented to the TLM input, and by TLM if a low impedance source is present at the TLM input. This taking of control on a time share basis is via an external transistor connected between the TLM input and ground. At the beginning of a PSK message TLM goes high. At the time of transfer from ID code to telemetry TLM begins clocking out a square wave where each cycle represents one bit of PSK code. The TLM bit pattern is a pulse width coded signal which is differentially encoded by the data generator 40 (see FIG. 5(d)).

A second flip-flop 84 is the PSK pulse start control. On power up the second flip-flop 84 is reset via an RC network. The first flip-flop 66 clocks the second flip-flop 84 at a rate chosen by selecting the repetition rate according to the REP RATE SELECT programming jumper selection. In the absence of an INHIBIT signal at D, Q of the second flip-flop 84 will go low since D is low. The low on Q via AND gate 86 causes the inhibit on the phase shift modulator 32 to be removed, and the phase shift modulator begins clocking out a PSK message.

The $\overline{Q}$ output of the second flip-flop 84 goes high at the same time resetting a PROM divider 90 and the PROM counter 46. The PROM divider 90 divides the 150 KHz square wave from the double divide-by-two counter 50 so that there are n cycles of 75 KHz output for each PSK data bit (n=7 in the given example). The reset of the PROM counter 46 by the second flip-flop 84 causes the PROM 28 to transfer the first bit of the programmed ID code selected to be transferred to the PROM output. After the selected ACQ TONE period for the first bit (to allow acquisition and lock-on of the PSK message by an acoustic receiver), the second flip-flop 84 is set by the 12-bit binary counter 58, Q2 or Q4. Setting the second flip-flop 84 causes the reset to be removed from the PROM divider 90 and the PROM counter 46, causing the PROM counter to begin sequencing the PROM address. At the same time NAND gate 88 is enabled to apply the clock from the PROM counter 46 to the data generator 40.

Conditions for end of message are: B0=1, the programmed output line B1-B3 connected to the END OF MESSAGE point is high, the PROM clock from the PROM counter 46 is high, and the second flip-flop 84 is set. This generates via AND gates 44 and 86 an inhibit on the PROM divider 90 and the phase shift modulator 32, stopping the PSK message sequence. At the expiration of the selected REP PERIOD from the 12-bit binary counter 58 and REP RATE SELECT the PSK message sequence is started again for the next PSK message.

A SYNC input will interrupt the PSK message sequence and cause it to begin again, thus synchronizing the entire pulse synthesizer unit 14.

A timer counter 92 is stepped by one of the outputs from the 12-bit binary counter 58 to provide a programmed TIME-OUT signal to the power control unit 12 to turn off the acoustic transmitter 10 to conserve energy. The timer counter 92 is started by the SYNC input and runs free until completion of its programmed cycle time.

Before launch of a vehicle containing the PSK acoustic transmitter 10, the pulse synthesizer unit 14 can be monitored to assure that it is in sync with the external time standard period. The clock 20 can be monitored by taking a sample of the 300 KHz output of the counter 48 via a resistor and outputting it on the TLM signal line as a ripple on the TLM signal. Also, the Q3 output of the repetition rate divider 78 can be monitored to assure that it coincides with the external time standard period. Finally, the output of NAND gate 80 from the repetition rate divider 78 may be used to mark a vehicle's internal record every eighth iteration to accommodate current processing hardware restraints for post-operational analysis of the recovered vehicle where realtime processing is unavailable.

Thus, the present invention provides a PSK pulse synthesizer, to replace prior tone burst generators in acoustic transmitters, which generates a PSK pulse wavetrain having a unique preprogrammed ID code and status/telemetry data. Since the PSK message is digital analog, the timing and thus the tracking accuracy is more precise than using the leading envelope of a tone burst.

What is claimed is:

1. A PSK pulse synthesizer to generate a PSK message for transmission by an underwater acoustic transmitter comprising:
   (a) means for providing independent timing for said PSK pulse synthesizer which is synchronized with an external standard time period;
   (b) means for selecting a unique identification code;
   (c) means for generating a PSK pulse wave train; and
   (d) means for selectively modulating said PSK pulse wave train by said unique identification code and by status and telemetry data.

2. A PSK pulse synthesizer as recited in claim 1 wherein said providing means comprises:

(a) a synchronization circuit triggered by a start pulse from said external time period; and (b) a plurality of counters synchronized by said start pulse to count down the pulses from a stable clock to produce a plurality of time pulse outputs of different frequencies which provide said independent timing.

3. A PSK pulse synthesizer as recited in claim 2 wherein said selecting means comprises:

(a) a programmed read only memory (PROM) having a plurality of identification codes;

(b) means for addressing the location in said PROM containing said unique identification code;

(c) a counter clocked by one of said time pulse outputs to address the bits of said unique identification code; and (d) means for coupling said unique identification code to be addressed to said generating means.

4. A PSK pulse synthesizer as recited in claim 3 wherein said selectively modulating means comprises a modulator having as an input the output of said generating means, having two outputs 180° out-of-phase with each other, and having means for switching the phase of said outputs according to the information content of said unique identification code and said status and telemetry data.

5. A PSK pulse synthesizer as recited in claim 4 wherein said generating means comprises means for combining two of said timing pulse outputs to produce two pulse trains which are identical but 180° out-of-phase.

6. A PSK pulse synthesizer as recited in claim 5 further comprising means for transferring control of said modulator from said unique identification code to said status and telemetry data.

7. A PSK pulse synthesizer as recited in claim 6 further comprising:

(a) means for encoding input telemetry data; and (b) means for interleaving said encoded input telemetry data with status data to form said status and telemetry data.

8. A PSK pulse synthesizer as recited in claim 7 further comprising means for repeating said PSK message at a selectable predetermined repetition rate.

9. A PSK pulse synthesizer as recited in claim 8 wherein said repeating means comprises:

(a) means for selecting a predetermined repetition period; and (b) means for generating a selected number of said PSK messages per said predetermined repetition period, said predetermined repetition period being equivalent to said external time period.

10. A PSK pulse synthesizer as recited in claim 9 further comprising means for automatically shutting off said underwater acoustic transmitter after a selected period of time.

* * * * *